United States Patent [19]
Nakamura et al.

[11] Patent Number: 6,072,564
[45] Date of Patent: Jun. 6, 2000

[54] OPTICAL MODULE AND APPARATUS HAVING THE SAME

[75] Inventors: Kenji Nakamura, Kasai; Kazumi Kageyama; Yoshito Tanaka, both of Sakai, all of Japan

[73] Assignee: Minolta Co., Ltd., Osaka, Japan

[21] Appl. No.: 08/988,591

[22] Filed: Dec. 11, 1997

[30] Foreign Application Priority Data

Dec. 12, 1996 [JP] Japan .................................. 8-332271

[51] Int. Cl.[7] .............................. G01C 3/00; G01C 5/00; G03B 3/10; G03B 13/34
[52] U.S. Cl. .................. 356/3.14; 356/3.15; 396/121; 396/123
[58] Field of Search .................. 356/3.01–3.15, 356/28, 28.5, 141.5; 396/121, 123

[56] References Cited

U.S. PATENT DOCUMENTS 3,470,377  9/1969  Le Febre et al. .
4,071,297  1/1978  Leitz et al. .
4,910,548  3/1990  Taniguchi et al. .
5,485,001  1/1996  Kusaka .
5,485,004  1/1996  Suzuki et al. .

FOREIGN PATENT DOCUMENTS 9-126757  5/1997  Japan .

*Primary Examiner*—Stephen C. Buczinski
*Attorney, Agent, or Firm*—Burns, Doane, Swecker & Mathis, LLP

[57] ABSTRACT

In a module which consists of optical systems and sensors, a pair of first line sensors are arranged vertically to a pair of second line sensors, and each of the line sensors is provided with a lens which projects an object image thereon. One of the first line sensors and one of the second line sensors intersect each other at right angles, and share an object lens which projects an object image onto them. In such a construction, the number of lenses, and the space for the line sensors are reduced, so that the module can be downsized.

17 Claims, 4 Drawing Sheets

FIG. 8(a)
PHOTOGRAPHIC IMAGE PLANE
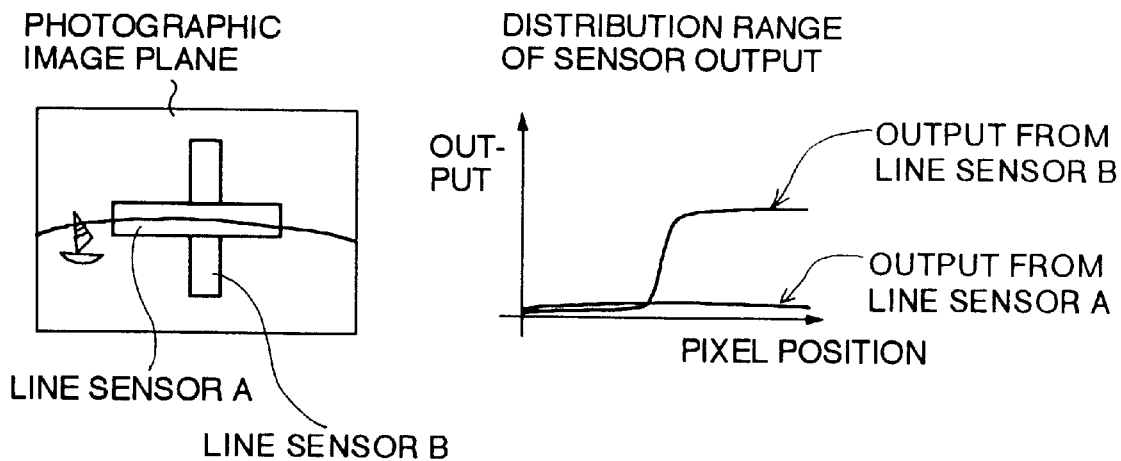
LINE SENSOR A
LINE SENSOR B
FIG. 8(b)
DISTRIBUTION RANGE OF SENSOR OUTPUT
OUTPUT FROM LINE SENSOR B
OUTPUT FROM LINE SENSOR A
OUTPUT
PIXEL POSITION
FIG. 9 PRIOR ART
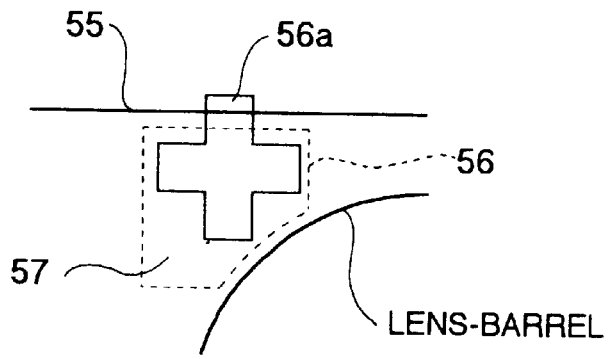
LENS-BARREL

OPTICAL MODULE AND APPARATUS HAVING THE SAME

BACKGROUND OF THE INVENTION

The present invention relates generally to an optical module which is used for the purpose of distance measuring, focus detecting and others, and in particular to an art for downsizing the module consisting of a pair of optical systems and a pair of sensors. Further, the invention relates to a distance measuring device having the module, and also an apparatus such as a camera, an image processing apparatus or a measurement device having said module.

An example of a conventional module which is used in a light-passive method (what is known as the AF sensor) is explained in FIGS. 5(a) and 5(b). As shown in these figures, the module comprises optical system 51 which consists of a pair of horizontally aligned lenses, and line sensors 52a and 52b. In the module constructed in this manner, however, an object distance can not be measured in case of the absence of contrast in a baseline direction, (e.g., the horizon etc.). This case is shown in FIGS. 6(a) and 6(b). FIG. 6(a) shows a photographic image plane in which the horizon is positioned in the baseline direction. In such a case, as shown in FIG. 6(b), an output from the line sensor has no changing component, hence it is impossible to measure the object distance. In order to solve such a problem, a module shown in FIGS. 7(a) and 7(b) consisting of two pairs of optical systems 51 and two pairs of sensors 52a, 52b, 53a and 53b, which are aligned vertically to each other, has been provided. In such a structure, contrast of an object is obtained in both of the vertical and horizontal directions, which makes it possible to measure object distance. This method is shown in FIGS. 8(a) and 8(b). In such a manner, although it is impossible to measure the object distance on the basis of output from the line sensor A (line sensors 52a and 52b), it is possible to measure the object distance on the basis of output from the line sensor B (line sensors 53a and 53b). In FIGS. 6(a) and 8(a), since line sensors in each of the pairs detect the same area in the photographic image plane, each of pairs of line sensors is depicted as one line sensor in the figures.

However, as shown in FIGS. 7(a) and 7(b), in the above-mentioned conventional module employing two pairs of optical systems and two pairs of sensors, one pair of optical systems with line sensors are aligned horizontally, and another pair of optical systems with line sensors which are aligned vertically, so the space or size of the module is increased. Therefore, in the case of mounting the module in a camera, the camera may not contain a part 56a of the module 56 inside a camera housing 55, or there may come a dead space 57. Moreover, there has been a problem that the camera in which the module 56 is mounted, is upsized.

SUMMARY OF THE INVENTION

This invention is made to solve the above-mentioned problems. One object of the present invention is to provide a downsized module employing two pairs of optical systems and two pairs of sensors. Another object of the present invention is to provide an apparatus which is downsized by use of the above-mentioned module.

For this end, according to one aspect of the present invention, there is provided an optical module which is used for distance measuring, focus detecting etc., employing two pairs of optical systems and two pairs of sensors. The module comprises, a pair of first sensors, a pair of second sensors, a pair of first optical systems which project an object image onto the first sensors, and, a pair of second optical systems which project an object image onto the second sensors.

In the above-mentioned construction, one of lenses which are included in the first optical systems, is shared as one of lenses which are included in the second optical systems, therefore, the number of lenses, and the space for the sensors can be reduced, which makes it possible to downsize the module.

Another aspect of the present invention, there are provided an image processing apparatus having said module, and also a distance measuring device having said module. The image processing apparatus and the distance measuring device comprise, a pair of first image processing devices, and a pair of second image processing devices which are aligned in a direction which is different from a direction of said first image processing devices, wherein one of said first image processing devices is shared as one of said second image processing devices.

BRIEF DESCRIPTION OF THE DRAWINGS

In the drawings:

FIG. 8(a) is a view showing a photographic image plane by use of the conventional module shown in FIGS. 7(a) and 7(b);

FIG. 8(b) is a view showing a distribution of line sensor outputs in the case shown in FIG. 8(a); and, FIG. 9 is a view showing the general arrangement structure in a camera in which the conventional module is mounted.

DETAILED DESCRIPTION OF THE PREFERRED EMBODIMENT OF THE PRESENT INVENTION

Figure 1:
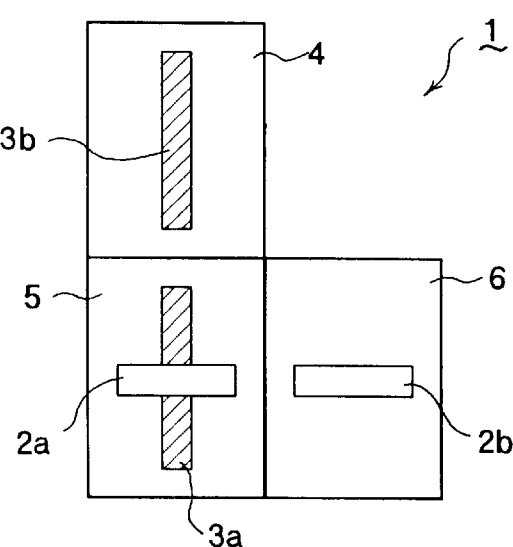
FIG. 1(a) is a front view of an optical module in accordance with a first embodiment of the present invention.
FIG. 1(b) is an external view of the module.
Figure 1:
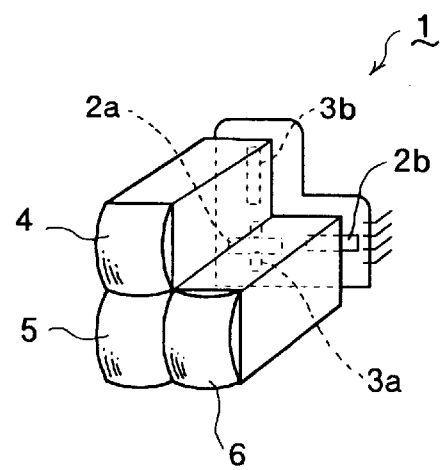

This invention will be described in further detail by way of example with reference to the accompanying drawings. FIGS. 1(a) and 1(b) show an optical module 1 for distance measuring, focus detecting etc. employed in the present embodiment, which includes a pair of horizontally aligned line sensors 2a and 2b in which a pixel arrays are horizontally located, a pair of vertically aligned line sensors 3a and 3b in which pixel arrays are vertically located, and object lenses 4, 5 and 6. The object lens 5 projects an object image onto the line sensors 2a and 3a, and the object lens 6 projects an object image onto the line sensor 2b. The object lens 5 is shared between the line sensors 2a and 3a which are unitedly arranged so as to be vertical to each other.

Figure 3:
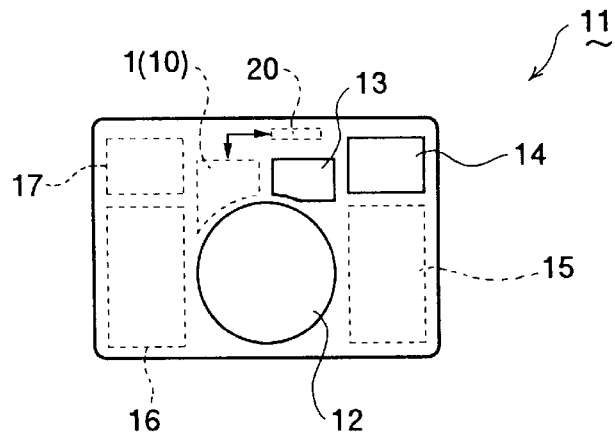
FIG. 3 is a view showing the general arrangement structure in a camera according to the first embodiment of the present invention.
Figure 4:
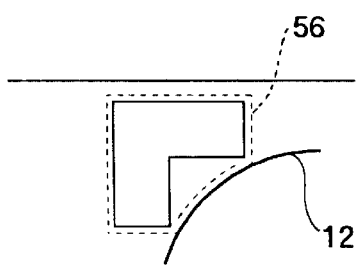
FIG. 4 is an enlarged view showing the module in the first embodiment.
Figure 5A:
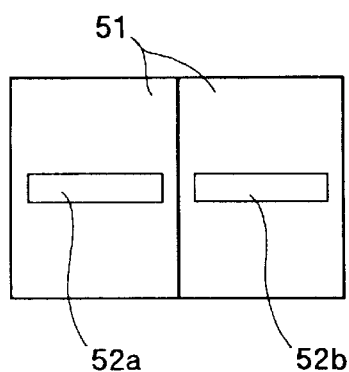
FIG. 5(a) is a front view of line sensors in a conventional module.
Figure 5B:
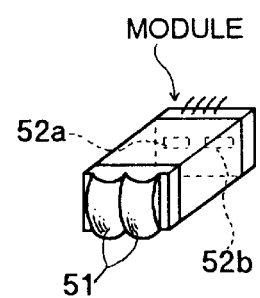
FIG. 5(b) is an external view of the above-mentioned conventional module.
Figure 6A:
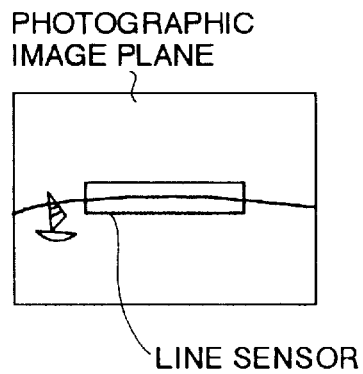
FIG. 6(a) is a view showing a photographic image plane by use of said conventional module.
Figure 6B:
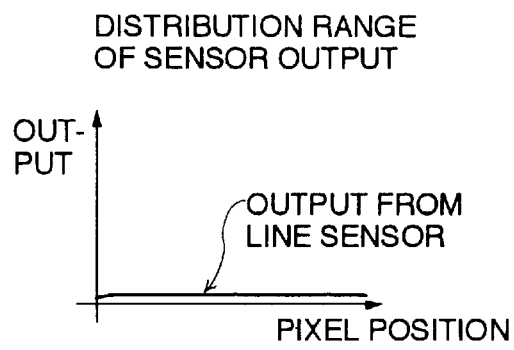
FIG. 6(b) is a view showing a distribution of line sensor output in the case shown in FIG. 6(a)
Figure 7A:
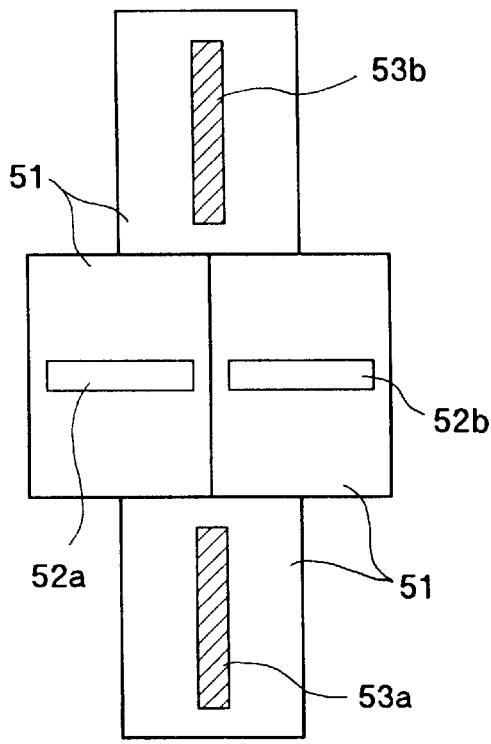
FIG. 7(a) is a front view of a conventional module in which two pairs of line sensors are arranged vertically to each other.
Figure 7B:
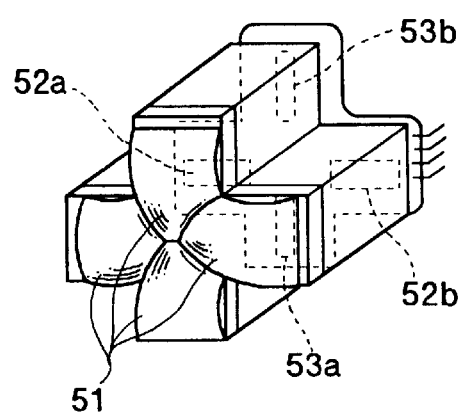
FIG. 7(b) is an external view of the above-mentioned conventional module.

FIG. 3 illustrates a camera according to the embodiment in which the module shown in FIGS. 1(a) and 1(b) is mounted, and FIG. 4 is an enlarged view illustrating the module in the camera shown in FIG. 3. In the case of mounting the module 1 in the camera as shown in FIGS. 3 and 4, the module 1 is efficiently arranged along with the outline shape of a lens-barrel 12 of a camera 11, which makes it easier to design the arrangement inside the camera 11, and so the camera 11 having the module can be downsized. The camera 11 comprises a viewfinder 13 for focusing and so forth, a flash 14 for emitting a light to an object, a cartridge chamber 15 for accommodating a film cartridge, a spool chamber 16 for winding up a film, and a driving unit 17 for driving systems. The viewfinder 13 is located on the upper left side of the lens-barrel 12, the flash 14 is arranged on one side of the viewfinder 13, the cartridge chamber 15, adjacent to the lens-barrel 12, is arranged under the flash 14, the spool chamber 16 is arranged on the opposite side of the cartridge chamber 15 across the lens-barrel 12, and the driving unit 17 is arranged on the upper side of the spool chamber 16. Besides, the camera 11 also has a CPU 20 for controlling all the operations of the camera 11. The CPU 20 performs computations on the basis of a signal from the module 1.

Now, the operation for detecting the object distance In the module 1 and the CPU 20 will be explained as follows. Outputs from the line sensors 2a and 2b are input into the CPU 20 for performing computations. The CPU 20 distinguishes focusing condition by detecting a relative deviation in distribution in quantity of light on the basis of the output from the line sensors 2a and 2b. For example, supposing light-receiving signals into which the distributions in quantity of light have been photoelectrically transferred, are a(k) and b(k) (k=1 to N, N=number of pixels in one of the line sensors), and the difference is i, the following equation will be derived.

$$V(i) = \sum_{k=1}^{N-1} |b(k) - a(k+1)|$$

The computation is executed on the basis of the above-mentioned equation. When the value V(0) is at a minimum, the CPU 20 judges a condition to be in focus state.

In the above-mentioned equation, when the value V(i) is not more than the predetermined value which is close to 0, the computation result is judged to be reliable, and so operations such as a lens driving, etc. will be executed based on the computation result. When the value V(i) is more than the predetermined value, the computation result is judged to be unreliable, and so the CPU performs the judgment of focusing condition by detecting a relative deviation in distribution in quantity of light on the basis of outputs from the line sensors 3a and 3b. Detected as discussed above, even if the horizon is photographed as an object in FIG. 8(a), and the output from the line sensor A (line sensors 2a and 2b) has no changing component, the output from the line sensor B (line sensors 3a and 3b) has changing component in the vertical direction. Thus, the object distance can be measured on the basis of the output from the line sensor B (line sensors 3a and 3b).

Figure 2:
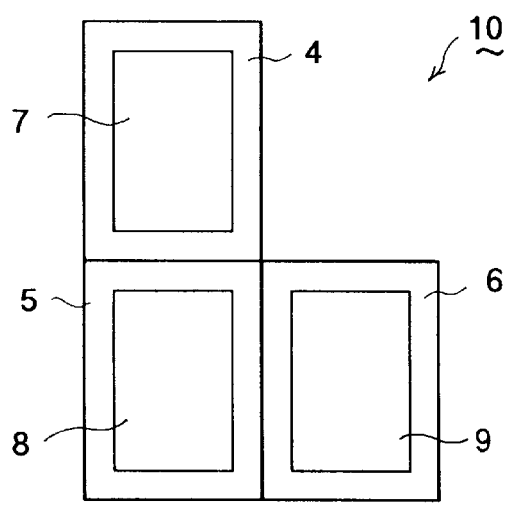
FIG. 2(a) is a front view of an optical module in accordance with a second embodiment of the invention.
FIG. 2(b) is an external view of the module.
Figure 2:
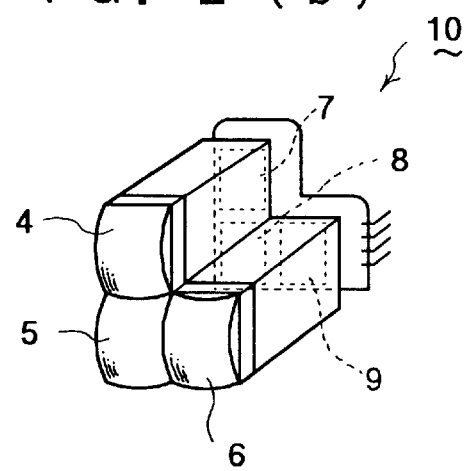

Next, second embodiment of the present invention will be explained with reference to FIGS. 2(a) and 2(b). FIGS. 2(a) and 2(b) show an optical module 10 for distance measuring, focus detecting, etc. employed in a camera according to the second embodiment of the present invention. The outward appearance of the camera is just the same as one shown in FIG. 3. The optical module includes a pair of horizontally aligned area sensors 8 and 9, and also includes an area sensor 7 which is arranged above said area sensor 8. Further, the module 10 comprises three object lenses 4, 5 and 6 for projecting an object image onto the area sensors 7, 8 and 9, respectively. In this construction, the area sensor 8 is paired with the area sensor 9 in the horizontal direction, and paired with the area sensor 7 in the vertical direction. The object lens 5 is shared between the pair of area sensors 8 and 9, and the pair of area sensors 8 and 7. As in the case of the first embodiment, output from the module 10 is transmitted to the CPU 20 of the camera 11, and the CPU 20 performs the computation on the basis of the output from the module 10.

As mentioned above, in the module 1 shown in FIG. 1, the line sensor 2a and the line sensor 3a are combined with each other, and share the object lens 5 as an optical system for projecting an object image onto them, therefore, the number of lenses, and the space for the line sensors can be reduced. Thus, although four object lenses have been needed in the conventional art, only three object lenses are enough to produce the same effect in the present invention, so that the module 1 can be miniaturized by the volume of one object lens. Moreover, the module 10 shown in FIG. 8 also produces the same effect.

While there has been described a preferred form of the invention, obviously modifications and variations are possible in light of the above teachings. For example, in the above-discussed embodiment, the module 1, it is shaped like a letter L, and in which the line sensor 2a and the line sensor 3a intersect each other at right angles, and share the lens 5 with each other. However, it is also possible to make the module in the inverted-L shape, in which the line sensor 2a and the line sensor 3b intersect each other at right angles, and share one object lens with each other. The same goes for the module using the area sensors. FIGS. 3 and 4 show an example in which the sensors are arranged as mentioned above. Further, although one of pairs of the sensors is aligned in the horizontal direction, and the other in the vertical direction in the previously-mentioned embodiments, these pairs of the sensors can be arbitrarily aligned in directions which are different from each other.

Moreover, the detection of focusing condition by detecting the relative deviation in distribution in quantity of light, it is not necessarily computed on the basis of the above-described equation, and it can also be computed based on other equations. Besides, the apparatus according to the present invention is not restricted to the camera, and the present invention can be applied to a measuring device, a mobile unit and an autonomous robot whose positions are autonomously controlled.

What is claimed is:

1. An optical module comprising:

a pair of first line sensors in which pixel arrays are arranged in a same direction;

a pair of second line sensors in which pixel arrays are arranged in a direction which is different from the direction of said first line sensors;

a pair of first optical systems which project an object image onto said first line sensors; and, a pair of second optical systems which project an object image onto said second line sensors, wherein one of lenses which are included in said first optical systems, is shared as one of lenses which are included in said second optical systems.

2. An optical module as claimed in claim 1, wherein said pair of first line sensors and said pair of first optical systems are arranged perpendicularly to said pair of second line sensors and said pair of second optical systems.

3. An optical module comprising:

a pair of first area sensors;

a pair of second area sensors;

a pair of first optical systems which project an object image onto said first area sensors; and, a pair of second optical systems which project an object image onto said second area sensors, wherein one of lenses which are included in said first optical systems, is shared as one of lenses which are included in said second optical systems.

4. An optical module as claimed in claim 3, wherein said pair of first area sensors and said pair of first optical systems are arranged perpendicularly to said pair of second area sensors and said pair of second optical systems.

5. An optical module as claimed in claim 3, wherein one of said first area sensors onto which the above-mentioned shared lens projects an object image, is shared as one of said second area sensors.

6. An apparatus comprising:

a pair of first image processing devices;

a pair of second image processing devices which are aligned in a direction which is different from a direction of said first image processing devices:

a pair of first optical systems which project an object image onto said first image processing devices; and a pair of second optical systems which project an object image onto said second image processing devices, wherein one of lenses included in said pair of first optical systems is shared as one of lenses included in said second optical systems, and wherein one of said first image processing devices is shared as one of said second image processing devices.

7. An apparatus as claimed in claim 6, wherein said first and second image processing devices are area sensors.

8. An apparatus as claimed in claim 6, wherein said apparatus is a camera.

9. An apparatus as claimed in claim 6 further comprising a controller for performing computations based on output from said first and second image processing devices.

10. An apparatus as claimed in claim 8 further comprising a controller for controlling camera operations including distance detection based on output from said first and second image processing devices.

11. A device comprising:

a pair of first line sensors in which pixel arrays are arranged in a same direction;

a pair of second line sensors in which pixel arrays are arranged in a direction which is different from the direction of the first line sensors;

a pair of first optical systems which project an object image onto said first line sensors; and, a pair of second optical systems which project an object image onto said second line sensors, wherein one of lenses which are included in said first optical systems, is shared as one of lenses which are included in second optical systems.

12. A device as claimed in claim 11, wherein said pair of first line sensors and said pair of first optical systems are arranged perpendicularly to said pair of second line sensors and said pair of second optical systems.

13. A device comprising:

a pair of first area sensors;

a pair of second area sensors;

a pair of first optical systems which project an object image onto said first area sensors; and, a pair of second optical systems which project an object image onto said second area sensors, wherein one of lenses which are included in said first optical systems, is shared as one of lenses which are included in said second optical systems.

14. A device as claimed in claim 13, wherein said pair of first area sensors and said pair of first optical systems are arranged perpendicularly to said pair of second area sensors and said pair of second optical systems.

15. A device as claimed in claim 13, wherein one of said first area sensors onto which the above-mentioned shared lens projects an object image, is shared as one of said second area sensors.

16. A device comprising:

a pair of first image processing devices;

a pair of second image processing devices which are aligned in a direction which is different from a direction of said first image processing devices;

a pair of first optical systems which project an object image onto said first image processing devices;

and a pair of second optical systems which project an object image onto said second image processing devices, wherein one of lenses which are included in said first optical systems is shared as one of lenses which are included in said second optical systems, and wherein one of said first image processing devices is shared as one of said second image processing devices.

17. A device as claimed in claim 16, wherein said first and second image processing devices are area sensors.

* * * * *